United States Patent
Rosenberg et al.

(10) Patent No.: US 7,337,463 B1
(45) Date of Patent: Feb. 26, 2008

(54) DISPLAYING HETEROGENEOUS VIDEO

(75) Inventors: Scott A. Rosenberg, Cupertino, CA (US); Oleg B. Rashkovskiy, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/522,053

(22) Filed: Mar. 9, 2000

(51) Int. Cl.
H04N 7/16 (2006.01)

(52) U.S. Cl. .................. 725/146; 348/385.1; 725/133; 725/153; 375/240.01; 375/240.26

(58) Field of Classification Search ............ 725/85–86, 725/90–93, 100, 38, 48, 59, 133, 153, 39–41; 348/584, 723, 724–6, 568, 385.1, 388.1, 348/426, 441; 370/485–487; 375/240.08, 375/240.01, 240.03, 240.05, 240.26, 240.28, 375/240.12
See application file for complete search history.

(56) References Cited

U.S. PATENT DOCUMENTS

| | | | |
|---|---|---|---|
| 5,625,410 A * | 4/1997 | Washino et al. ............ 348/154 |
| 6,005,620 A * | 12/1999 | Yang et al. | |
| 6,014,368 A * | 1/2000 | Sanami | |
| 6,084,910 A * | 7/2000 | Stanger et al. | |
| 6,108,039 A * | 8/2000 | Linzer et al. ............... 348/398 |
| 6,160,545 A * | 12/2000 | Eyer et al. .................. 345/327 |
| 6,172,988 B1 * | 1/2001 | Tiernan et al. .............. 370/473 |
| 6,188,436 B1 * | 2/2001 | Williams et al. ........... 348/387 |
| 6,233,253 B1 * | 5/2001 | Settle et al. ................ 370/474 |
| 6,404,818 B1 * | 6/2002 | Obikane ................ 375/240.28 |
| 6,456,335 B1 * | 9/2002 | Miura et al. ................ 348/588 |
| 6,651,252 B1 * | 11/2003 | Gordon et al. ................ 725/54 |
| 6,806,909 B1 * | 10/2004 | Radha et al. ............ 348/384.1 |
| 2001/0055322 A1 * | 12/2001 | Domon ....................... 370/537 |

OTHER PUBLICATIONS

Scott A. Rosenberg and Anthony C. Miller, U.S. Appl. No. 09/365,363, filed Jul. 30, 1999, entitled "Liquid Crystal Over Semiconductor Display With On-Chip Storage".

* cited by examiner

*Primary Examiner*—Ngoc Vu
(74) *Attorney, Agent, or Firm*—Trop, Pruner & Hu, P.C.

(57) ABSTRACT

Heterogeneous video may be independently encoded in a processor-based system and transmitted for display on a display device. In the display device, the independent video streams may be de-packetized for display on the same display at different frame rates. Thus, each of the video sources may be displayed in a separate portion of the display at its native frame rate. For example, an electronic programming guide may be transmitted for display at one frame rate and displayed in a distinct region on the display screen while video corresponding to an ongoing television program may be displayed in another portion of the display screen at its native frame rate.

3 Claims, 7 Drawing Sheets

DISPLAYING HETEROGENEOUS VIDEO

BACKGROUND

This invention relates generally to video display devices and particularly to display devices that display heterogeneous video.

Heterogeneous video is video from disparate sources which is intended to be displayed on a single video display device. The video may be graphics or streaming video normally associated with television programming. The graphics may come, for example, from an associated processor-based system for display on a display device which also receives other video sources. The heterogeneous video may also include video from a playback device such as a video cassette recorder or digital versatile disk player, games, and applications like e-mail, web browsers and word processors.

Conventionally, heterogeneous video is displayed on a single display device by mixing the disparate content within a processor-based system and then coding the disparate content to a single common video output signal for interface to the display. Inevitably, such an output represents an awkward compromise between different ideal representations for each of the sources and limitations imposed by the actual display device.

For example, the simultaneous display of a first video at twenty-four bits per pixel and sixty frames per second with a second video at sixteen bits per pixel and sixty frames per second may require that both videos be converted into a common output format, for example, of twenty-four bits per pixel and sixty frames per second. While this output format may be advantageous for the first video, it amounts to a over representation of the second video which only requires sixteen bits per pixel. This "up-conversion" of the second video source unnecessarily increases the amount of bandwidth required to transport the first source to the display.

The unnecessary additional bandwidth and sub-optimal representation of at least one of more than one video source may result from the practice of adapting heterogeneous video sources to a single format. Thus, there is a need for a way of handling heterogeneous video which does not unnecessarily waste bandwidth or diminish the representation of some (if not all) of the video from various video sources.

DETAILED DESCRIPTION

Figure 1A:
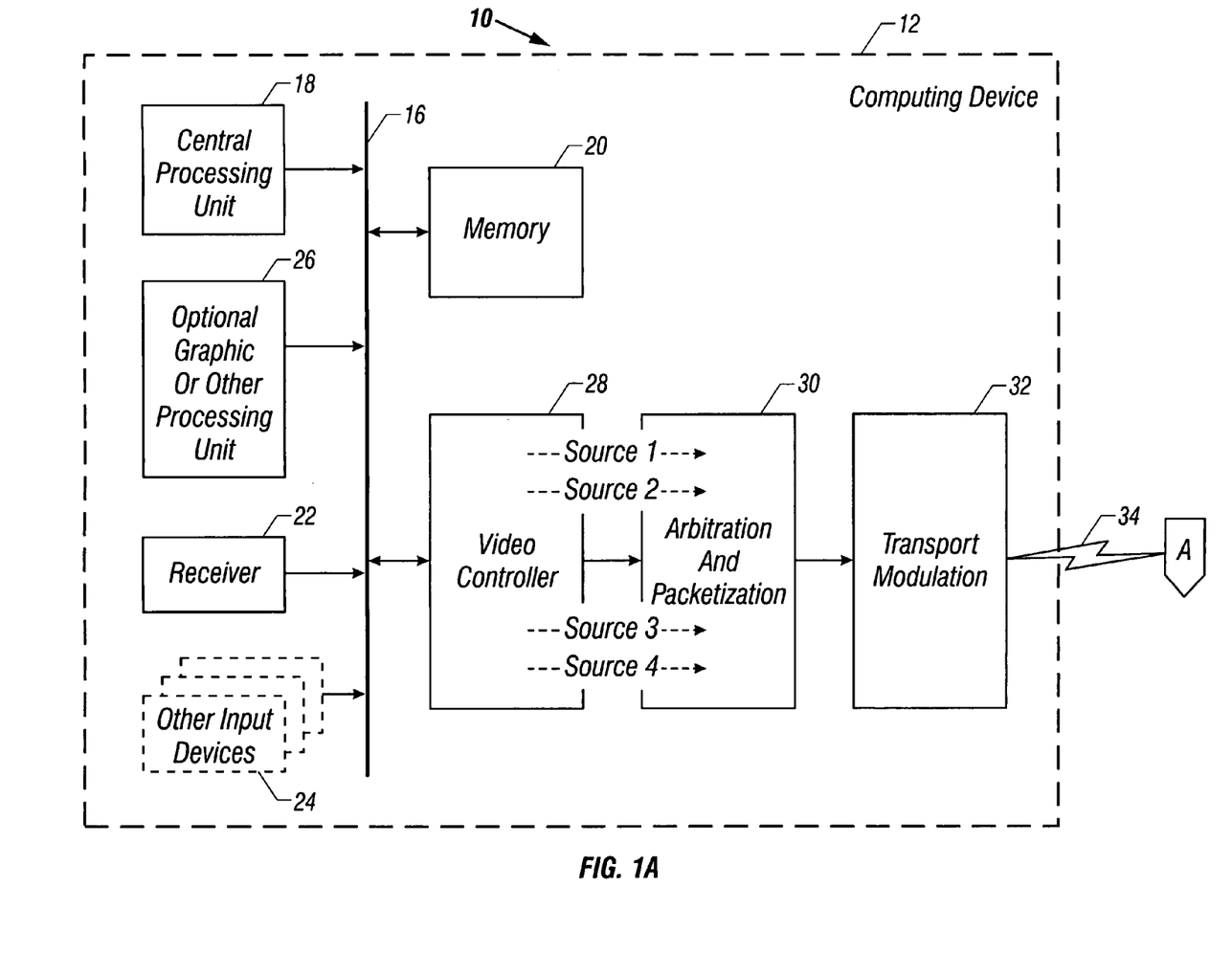
FIGS. 1A and 1B are schematic depictions of one embodiment of the present invention including a computing device which communicates with a display device.
Figure 1B:
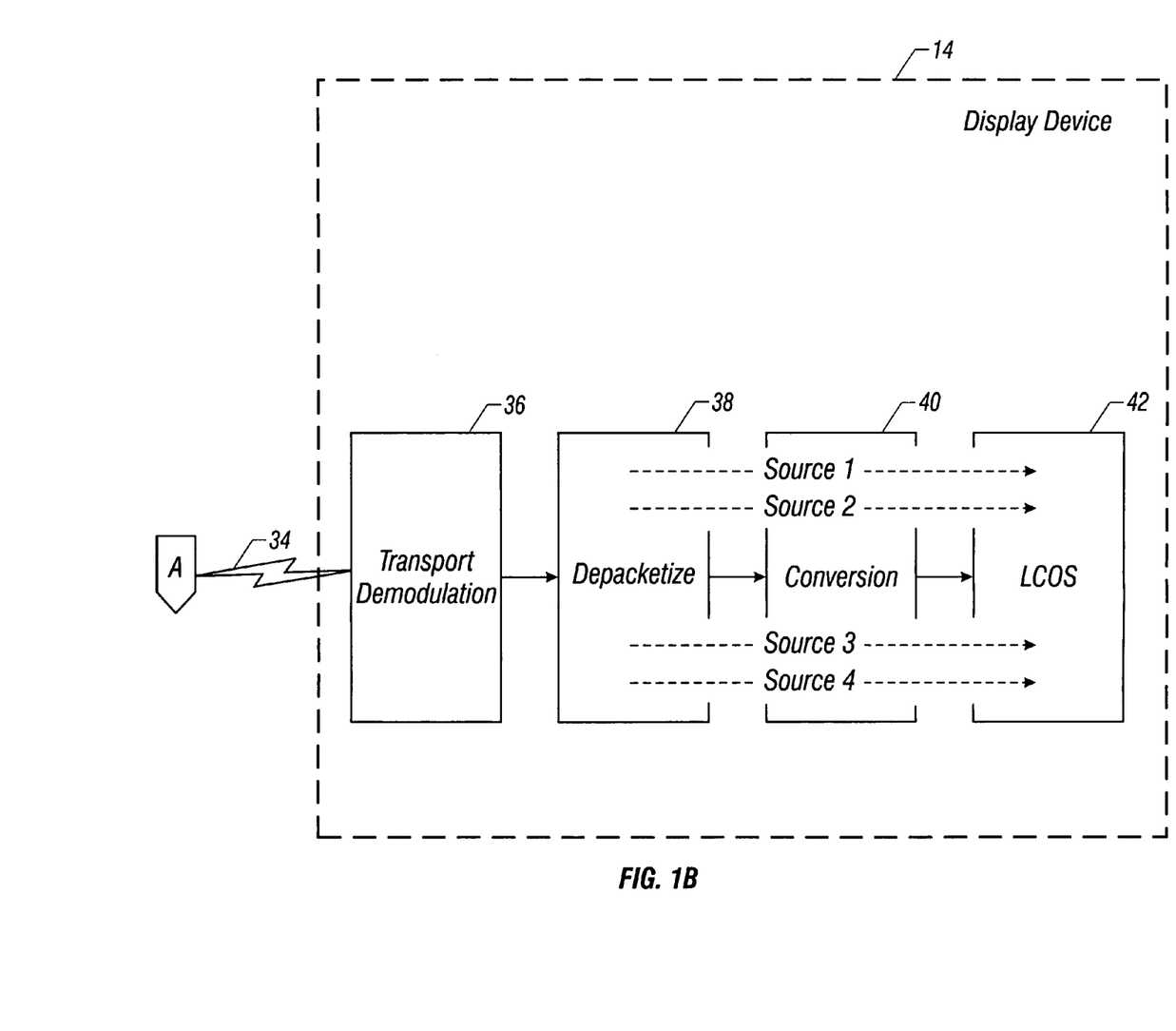

Referring to FIG. 1, a computing device 12 may communicate over an interface 34 with a display device 14. In one embodiment of the present invention, the interface 34 is a wireless interface such as a radio wave or infrared interface. However, other interfaces including wired connections may be utilized as well.

In one embodiment of the present invention, the computing device 12 may be a set-top box that communicates with a display device 14 that is a television receiver. However, the computing device 12 may be any processor-based device including a desktop computer, a laptop computer, or a processor-based appliance.

In accordance with one embodiment of the present invention, when a heterogeneous video is intended to be displayed on the display device 14, each of the disparate video streams (such as the sources 1-4 in FIG. 1) that make up the heterogeneous video may be conveyed from the computing device 12 to the display device 14 independently. These video streams come from a variety of sources, including a television signal or graphics generated by the processing unit of the computing device 12.

The computing device 12 may include a central processing unit 18, graphics or other processing units 26, a television receiver 22, and other input devices 24 coupled by a bus 16. A system memory 20 may also be coupled to the bus 16. A video controller 28, coupled to the bus 16, provides a series of independent video sources, indicated as sources 1-4 in FIG. 1, to an arbitration and packetization unit 30.

As an example, a first video stream (source 1) may come from a terrestrial or satellite television system while a second video stream (source 2) may represent graphical information describing the first video source and generated locally by the computing device 12. These graphics may be a television programming guide also known as an electronic content guide or an electronic programming guide (EPG).

The arbitration and packetization unit 30 may simultaneously drive independent video sources at their natural rates onto different portions of the display screen of a display device 14. Thus, in the example described above, the video information may be displayed on one portion of the display 14 at a native frame rate of sixty Hertz while the graphical information may be updated more infrequently, for example at 25 Hertz.

Each of the video sources may be converted into packets by the unit 30 for more efficient transport by a transport modulation unit 32. If more sources are available than the bandwidth permits, the unit 30 arbitrates which sources are transmitted during a given interval.

In the display device 14, the received packets from the interface 34 are demodulated by a transport demodulation unit 36. The demodulated packets are then depacketized in the depacketization unit 38. The unit 38 recreates the separate video sources which are then converted by the conversion unit 40 into an appropriate format for display on the display element 42.

In one embodiment of the present invention, the display screen 42 may use liquid crystal over semiconductor (LCOS) imaging devices with embedded storage and other processing elements. The conversion unit 40 receives the independent video signals, converts the signals to a format compatible with its LCOS display element or screen 42 and then drives the signals onto the LCOS display screen 42. By incorporating an integrated storage into the LCOS display screen 42, as described hereinafter, the video signals may be driven onto the display element 42 in a random access pattern similar to that employed when driving new information into traditional memory technologies such as dynamic random access memory (DRAM) and static random access memory (SRAM).

Figure 2:
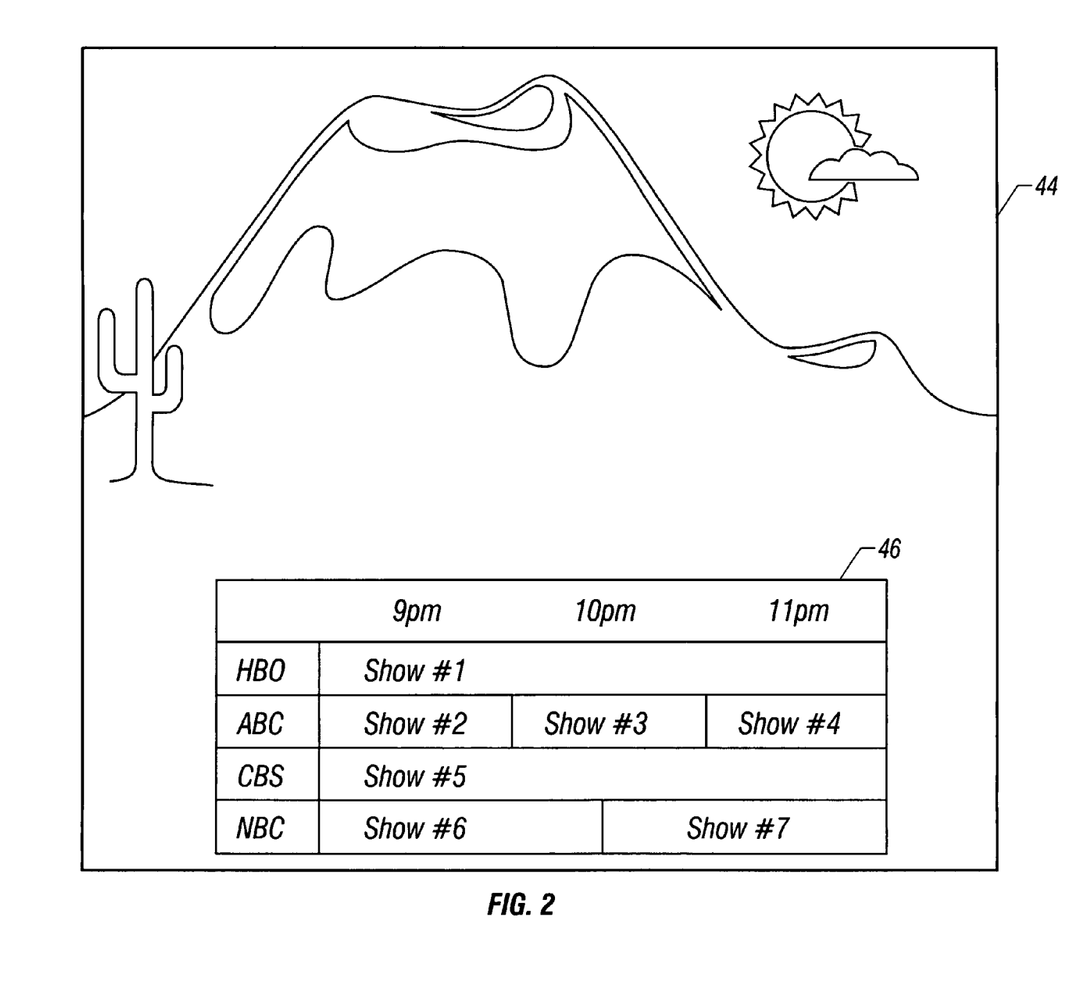
FIG. 2 is a screen display for the embodiment shown in FIGS. 1A and 1B in accordance with one embodiment of the present invention.

Thus, referring to FIG. 2, an electronic programming guide (EPG) may be displayed in the region 46 of the LCOS display screen 42 and an ongoing television program may be displayed in the region 44 in one embodiment of the invention. The EPG may include a plurality of channels listed down the left margin and a series of times, listed across the top of the region 46 in a grid pattern indicating what programs (shows # 1-7) are available for viewing on any given channel at any of the indicated times. Thus, the user may select from among the electronic programming guide entries. For example, by mouse clicking using an input device, a user may select a particular program for full screen viewing. While making the decision, one video source may be displayed in the region 44. Of course, a wide variety of display formats may be used.

In this way, the video stream from one video source may be displayed at its native rate in the region 44 while the electronic programming guide (which may be in the form of graphical information) displayed in the region 46 may be updated less frequently. Thus, each of the video sources may be assigned to a distinct, predetermined region of the overall display screen 42 to facilitate the accommodation of the native characteristics of each of two or more video sources.

While FIG. 2 illustrates a situation where only two video sources are displayed, more than two video sources may be provided by dedicating specific screen portions to each video source. In one embodiment of the present invention, the display screen 42 may be divided into quadrants each assigned to one of four potential video sources. In some cases, where only one source is available, that source may be displayed full screen. In other cases, the user may select among the various available sources for either full screen or split screen display.

In some embodiments of the present invention, the video streams that drive less information to the display than others need not be "up-converted" to higher information formats prior to transmission to the display. This may save transmission bandwidth between the computing device 12 and the display device 14 that might otherwise be used for the transport of other valuable video information. In addition, the ability to present video sources at their native rates may yield a perceptually superior video presentation. The rate conversion process may degrade the source from its native format. Because the burden of converting all video sources into a single common format may be removed from the computer device 12 and the bandwidth of the information being driven to the display may potentially be reduced, the requirements on the memory and processing elements in the computer device 12 may be eased, yielding a system with additional performance margin. The added performance margin may then be applied to other processing operations or alternatively, the system may be cost reduced to a level sufficient to simply drive the display.

Figure 4:
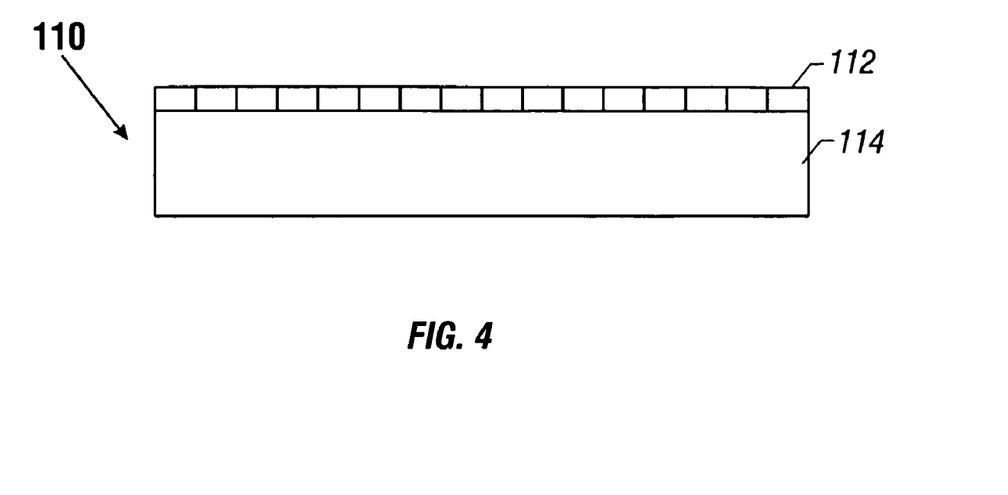
FIG. 4 is a schematic cross-sectional view of one embodiment of the display in accordance with the present invention.

The display element 42 may be implemented as an electro-optical device 110, such as a spatial light modulator (SLM) as shown in FIG. 4. The device 110 may include a plurality of reflective mirrors 112 defined on a semiconductor substrate 114 in accordance with one embodiment of the present invention. Advantageously, the device 110 is implemented using liquid crystal over semiconductor (LCOS) technology. LCOS technology may form large screen projection displays or smaller displays (using direct view rather than projection technology). With LCOS technology, the liquid crystal display is formed in association with the same substrate that forms complementary metal oxide semiconductor (CMOS) circuit elements. The display may be a reflective liquid crystal display.

The device 110 may include a silicon substrate 114 with a metal layer defining the mirrors 112. The mirrors 112 may be the mirrors of an electro-optic display such as a liquid crystal display. For example, the mirrors 112 may be part of spatial light modulator (SLM) for one of the color planes of a tricolor display. Potentials applied to the mirrors 112 alter the liquid crystal to modulate the incoming light to create images which then can be directly viewed or projected onto a projection screen.

Figure 5:
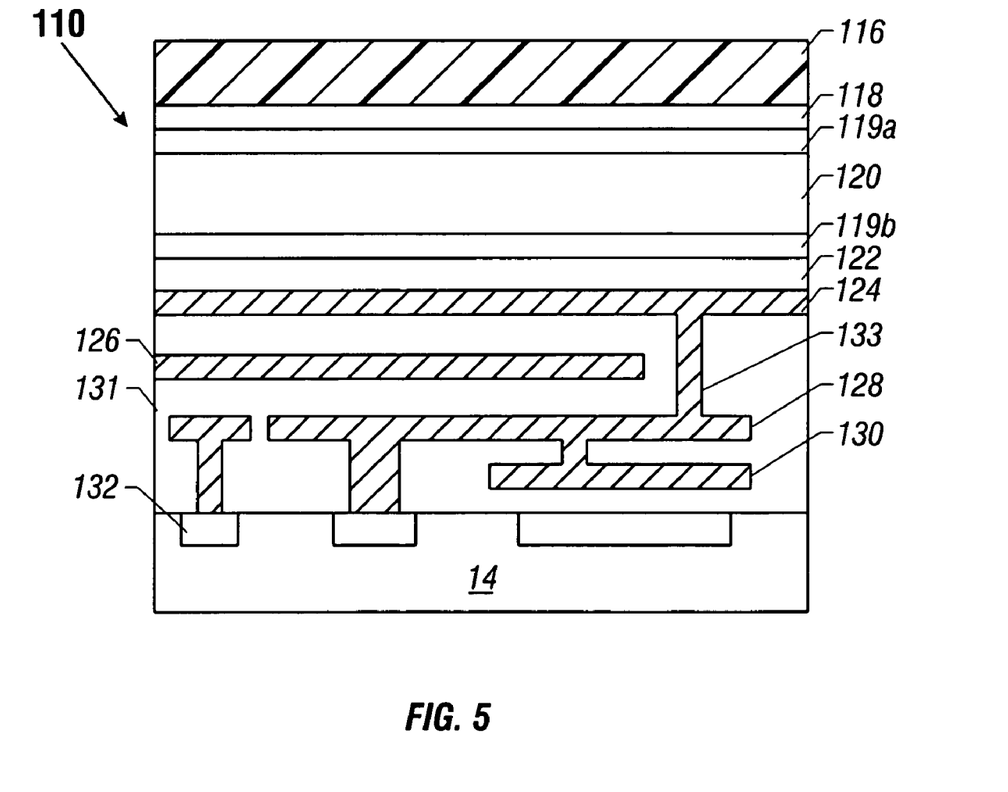
FIG. 5 is a more detailed, enlarged cross-sectional view of the display of the type shown in FIG. 1.

Referring to FIG. 5, each cell or pixel of the display may include a reflective mirror 124 forming one of the mirrors of one of the pixels 112 shown in FIG. 4. In one embodiment of the invention, each cell may be rectangular or square and a slight spacing may occur between each adjacent mirror 124. Thus, a rectangular array of mirrors 124 may form an array of pixel elements in conjunction with liquid crystal material 120 positioned over the mirrors 124.

The LCOS structure includes a substrate 114 having doped regions 132 formed therein. The doped regions 132 may define transistors for logic elements and/or memory cells which operate in conjunction with the display pixels as will be described hereinafter. Four or more metal layers may be provided, including a metal one layer 130 which is spaced by an inter-layer dielectric (ILD) 131 from a metal two layer 128 and a metal three layer 126. A metal four layer may form the pixel mirrors 124. Thus, for example, the metal two layer 128 may provide light blocking and the metal one layer may provide the desired interconnections for forming the semiconductor logic and memory devices. The pixel mirrors 124 may be coupled, by way of vias 133, with the other metal layers.

A dielectric layer 122 may be formed over the mirror 124. A liquid crystal or electro-optic material 120 is sandwiched between a pair of buffered polyimide layers 119a and 119b. One electrode of the liquid crystal device is formed by the metal layer 124. The other electrode is formed by an indium tin oxide (ITO) layer 118.

A top plate 116 may be formed of transparent material. The ITO layer 118 may be coated on the top plate 116. The polyimide layers 119a and 119b provide electrical isolation between the capacitor plates which sandwich the electro-optic material 120. However, other insulating materials may be coated on the ITO layer 118 in place of or in addition to the polyimide layers.

Figure 6:
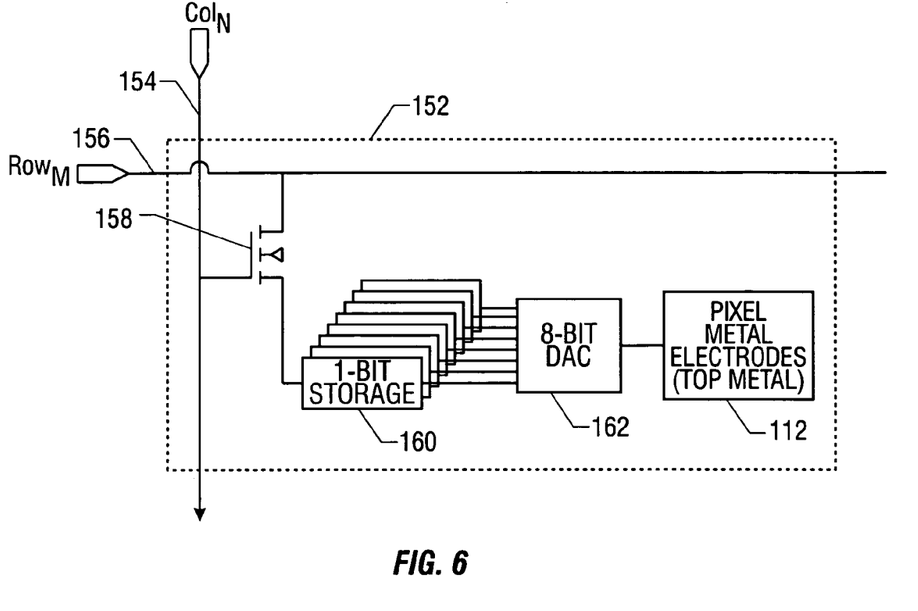
FIG. 6 is a schematic diagram of one cell of the display in accordance with another embodiment of the present invention.

Using the LCOS structure, for example as depicted in FIG. 6, a memory element or array may be incorporated into the same silicon substrate which includes the pixel array. A memory 160 may be integrated with each pixel cell 112. In some embodiments, pixel information may be passed through a digital to analog converter (DAC) 162 to produce gray scale information. The particular manner in which pixels are arranged in the storage array and converted to analog signals may vary by implementation.

Each pixel cell 112 metal electrode or top metal 124 may be coupled to a separate DAC 162. In one embodiment of the present invention, the DAC may be an eight bit DAC coupled to eight one bit storage elements 160. Each storage memory 160 may, for example, be a static random access memory (SRAM) cell. Each one bit storage element 160 may be coupled by a transfer transistor 158 to a different row 156 and a column 154. Thus, the information which is used to refresh the metal 124 may be stored in the memory 160.

When it is desired to change the pixel information to change the displayed image, then the information in the memory 160 is refreshed.

Since the display refresh controller only needs to refresh new information to the display 14, the overall drain on the computing device 12 including the buses and memory may be reduced, potentially yielding better performance out of the other components in the computer system which rely on these limited resources. In addition, the amount of redundant information flowing to the display 14 may be reduced, allowing more new information to be sent to the display. This potentially enables the display of higher resolution or higher rate images.

Figure 7:
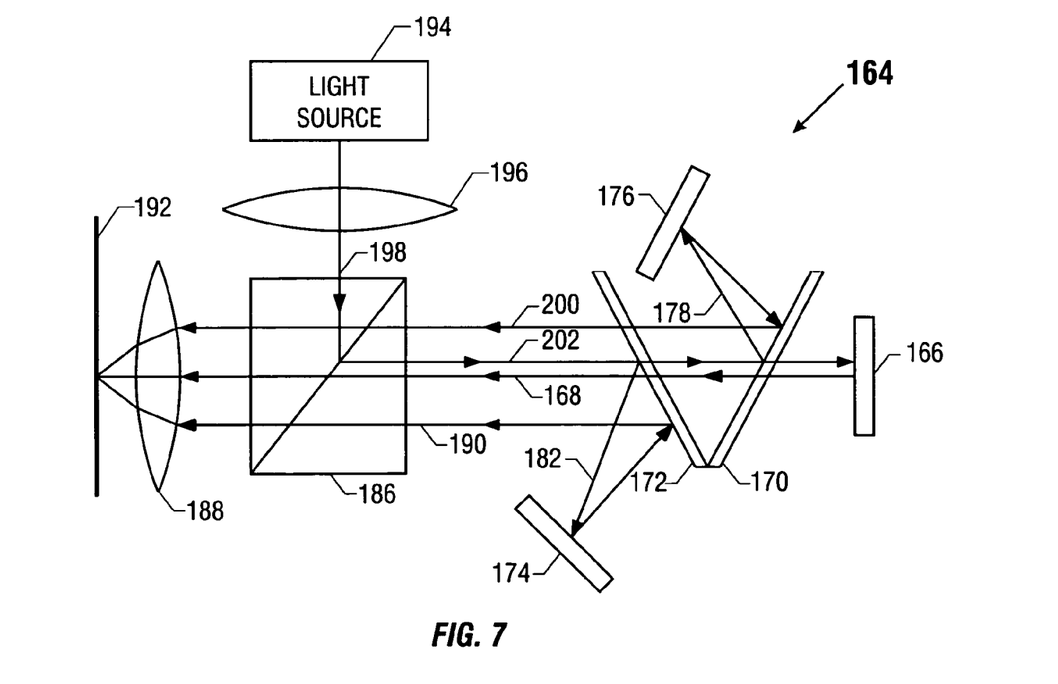
FIG. 7 is a schematic diagram of a display implementing one embodiment of the present invention.

In one embodiment of the present invention, a projection display 164, shown in FIG. 7, includes the spatial light modulator display panels 166, 174 and 176, using liquid crystal over silicon technology with integrated memory. The reflective liquid crystal display projection system 614 typically includes a modulator or display panel (LCD display panels 174, 166 and 176) for each primary color that is projected onto a screen 192. In this manner, for a red-green-blue (RGB) color space, the projection system 164 may include an LCD display panel 174 that is associated with a red color band, an LCD display panel 166 that is associated with the green color band and LCD display panel 176 that is associated with the blue color band. Each of the LCD display panels 166, 174 and 176 modulates light from the light source 194 and the optics 196 that form red, green and blue images, respectively, and add together to form a composite color image on the screen 192. To accomplish this, each LCD display panel receives electrical signals indicating the corresponding modulated beam image to be formed.

More particularly, the projection display 64 may include a beam splitter 186 that directs a substantially collimated white beam 198 of light, provided by the light source 194, to optics that separate the white beam 198 into red 182, blue 178 and green 202 beams. In this manner, the white light beam 198 may be directed to a red dichroic mirror 172 that reflects the red beam towards the LCD display panel 174 that, in turn, modulates the red beam 182. The blue beam passes through the red dichroic mirror to a blue dichroic mirror 170 that reflects the blue beam towards the LCD panel 176 for modulation. The green beam 202 passes through the red and blue dichroic mirrors for modulation by the LCD display panel 166.

For reflective LCD display panels, each LCD display panel 166, 174 and 176 modulates the incident beam and reflects the modulated beams 168, 200 and 190 respectively, so that the modulated beams return on the paths described above to the beam splitter 186. The beam splitter 186, in turn, directs the modulated beams through projection optics such as a lens 188, to form modulated beam images that ideally overlap and combine to form the composite image on the screen 192. Each of the panels 166, 174, and 176 may be implemented using liquid crystal over semiconductor technology as illustrated for example in FIG. 5.

Figure 3:
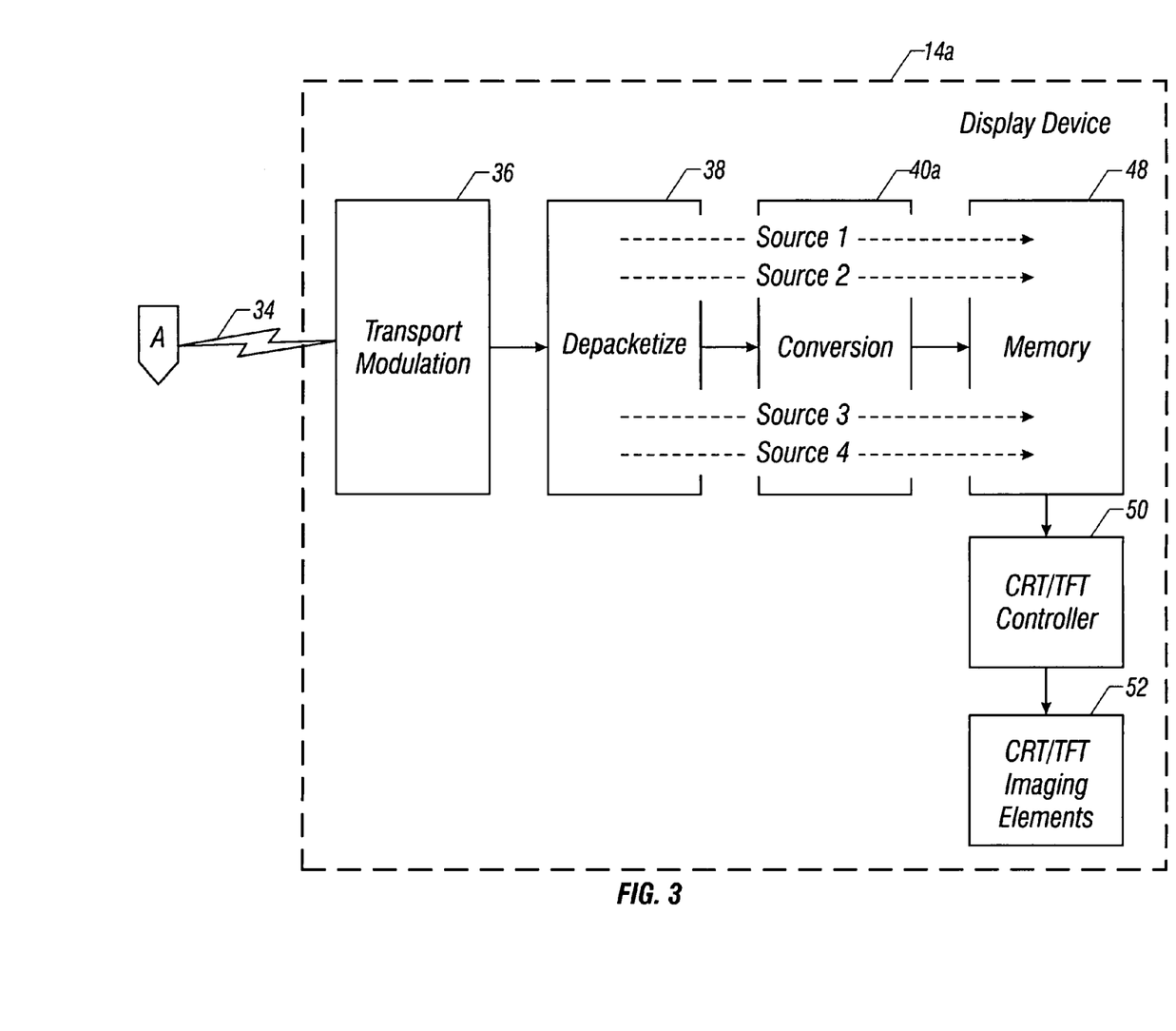
FIG. 3 is a schematic depiction corresponding to FIG. 1B for still another embodiment of the present invention.

Referring to FIG. 3, another embodiment of the present invention may include a computing device 12 which operates as described in connection with FIG. 1A and a display device 14a which has been modified from the embodiment shown in FIG. 1B.

The display device 14a may use a legacy display technology such as a cathode ray tube or a thin film transistor-liquid crystal display 52 with integrated memory and processing elements. Like the embodiment of FIG. 1A, independent video streams may be driven to the display device 14a from the computing device 12. In the display device 14a, these video sources are converted to a common frame buffer format, and driven onto the integrated memory 48 through the use of an arbiter and addressing circuitry 40a. Simultaneously, video is scanned out of this memory 48 in a synchronous, regular fashion by a controller 50 and driven onto the imaging elements 52.

Figure 8:
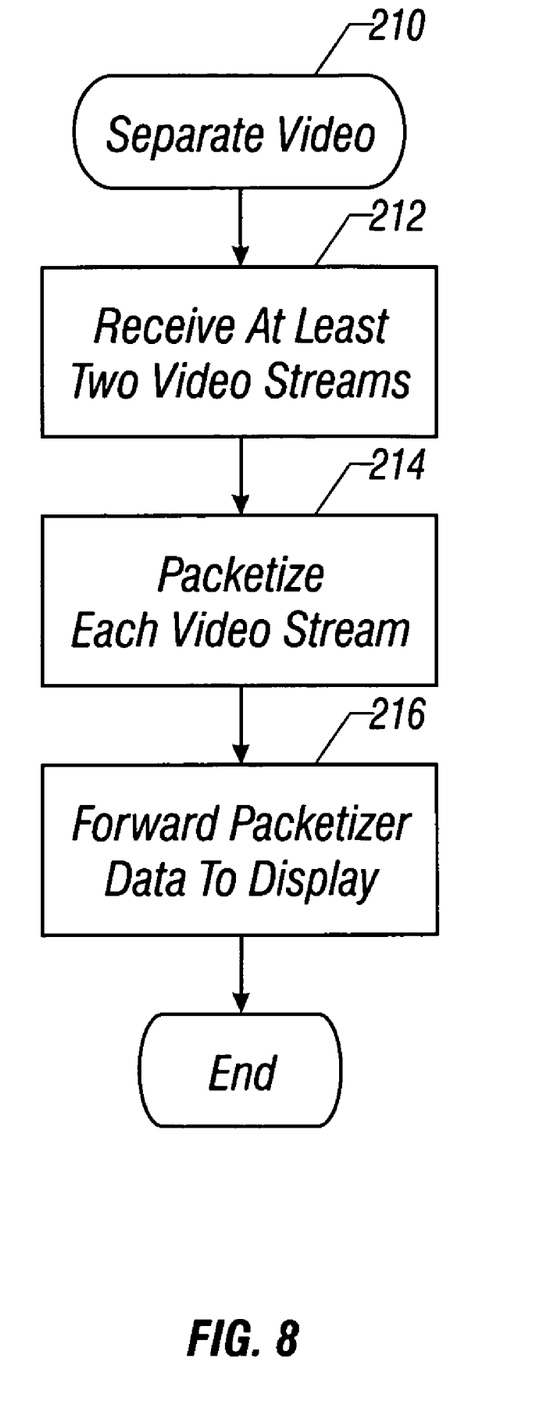
FIG. 8 is a flow chart for software in accordance with one embodiment of the present invention.

In accordance with one embodiment of the present invention, software 210, shown in FIG. 8, may be utilized by the computing device 12 in the embodiment of FIG. 1A to control the generation of independent, packetized video sources. At least two video streams are received in the computing device 12 as indicated in block 212. Each video stream is packetized as indicated in block 214. The independent, packetized video streams are then sent to the display as indicated in block 216 for subsequent de-packetization and display.

Some embodiments of the present invention may exhibit superior performance to systems where heterogeneous video signals are mixed in the computing device prior to modulation for the display. Since only new information is transferred to the display, bandwidth may be saved, power consumption may be reduced and the generation of heat in the communication between the computing device and the display may be reduced in some embodiments. In addition, in some embodiments of the present invention, perceptually superior display of disparate video sources is possible relative to systems where the content is mixed in the computing device. Instead of aggregating and synchronizing all the video sources in the computing device and thereby forcing all streams into a single, least-common-denominator format and timing, video sources may be independently streamed to the display and presented in their native format. In some cases, the performance of the computing device may be enhanced.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
   a processor;
   a storage coupled to said processor;
   a video controller coupled to said processor; and
   a packetization device coupled to said video controller to independently packetize at least two moving picture video streams in different frame rates for transmission thereof to a display device without converting frame rates of said moving picture video streams to a common frame rate.

2. The system of claim 1 including a modulation device to modulate and transport independently packetized streams.

3. The system of claim 1 wherein each of said video streams has a different frame rate and is packetized to be de-packetized at the different frame rate in the display device.

* * * * *